March 26, 1929.   W. O. B. MOORE   1,706,495
AUTOMOBILE ATTACHMENT
Filed Sept. 16, 1927

Inventor
W.O.B.Moore

Patented Mar. 26, 1929.

1,706,495

UNITED STATES PATENT OFFICE.

WILLIAM O. B. MOORE, OF WINNIPEG, MANITOBA, CANADA.

AUTOMOBILE ATTACHMENT.

Application filed September 16, 1927. Serial No. 220,003.

The invention relates to improvements in automobile attachments and an object of the invention is to provide a device specially designed for attachment to automobile, truck or such like vehicle hubs and which will permit by the use of a jack of the ready raising of the wheel and of the subsequent placing of chains or such like on the wheel.

A more particular object of the invention is to provide an extension sleeve which can be screwed to the hub after the customary hub cap has been removed, the sleeve being provided with a rotatable band adapted to be engaged by a jack, the arrangement permitting of the raising of the wheel by the manipulation of the jack and of the subsequent easy turning of the raised wheel.

A further object of the invention is to construct the device so that it can be used also as a wheel puller.

With the above more important objects in view, the invention consists essentially in the arrangement and construction of parts hereinafter more particularly described, reference being had to the accompanying drawing, in which:—

In the drawing like characters of reference indicate corresponding parts in the several figures.

Figure 1:
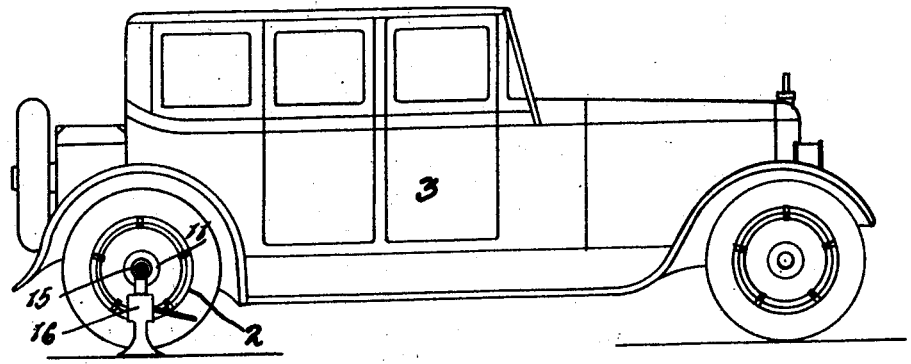
Fig. 1 is a side view of the device and showing an automobile jack engaging the same and holding the wheel in an elevated position.

I have herein shown the device as secured to the hub 1 of the rear wheel 2 of an automobile 3 but in this connection I wish it to be understood that the device can be attached to any of the wheels as occasion requires. The hub herein shown is of the conventional type and carries the usual wheel spokes 4 and receives rotatably the axle 5. The hub is exteriorly screw threaded at 6 to receive the usual hub cap (not herein shown).

At the present time, it is quite difficult in many makes of cars to place an automobile jack underneath the rear axle, such being on account of the various trunk holders, trunks, wheel holders and so forth which are located at the rear of the car. This difficulty is more pronounced also when a wheel sinks in a rut or mud. The device which I have provided is designed to screw onto the hub after the customary hub cap (not herein shown) has been removed.

Said device embodies a sleeve 7 of predetermined length having one end slightly enlarged and internally screw threaded to receive the threads of the hub, the arrangement being such that when the sleeve is screw threaded to the hub it forms an extension thereof. The outer end of the sleeve is contracted in a manner to provide a socket 8. On the outer end of the sleeve, I mount rotatably a band or ring 9 which is held against endwise displacement by two collars 10 and 11 permanently secured in any suitable manner to the sleeve. Within the socket I mount a nut 12 which receives a screw 13, the screw extending outwardly and freely through a hole 14 provided in the closed end of the sleeve. The outer end of the screw is supplied with a hexagonal head 15 and the screw is axially aligned with the axle 5.

When it is desired to clear the rear wheel from the ground, one will remove the hub cap and screw the sleeve to the axle, the screw 13 at this time being in a position so that it will not interfere in any way with the free turning of the sleeve. Having attached the device, one will then employ an automobile jack 16 of the conventional type, the saddle or upper end of the jack being engaged with the band 9. Upon manipulating the jack in the proper direction, the jack will lift the outer end of the sleeve and in so doing will cause the raising of the wheel. After the wheel is raised, it is an easy matter to place the customary chain thereon as the wheel can be rotated owing to the fact that the sleeve is at this time free to turn in the band which is engaged with the jack.

Figure 2:
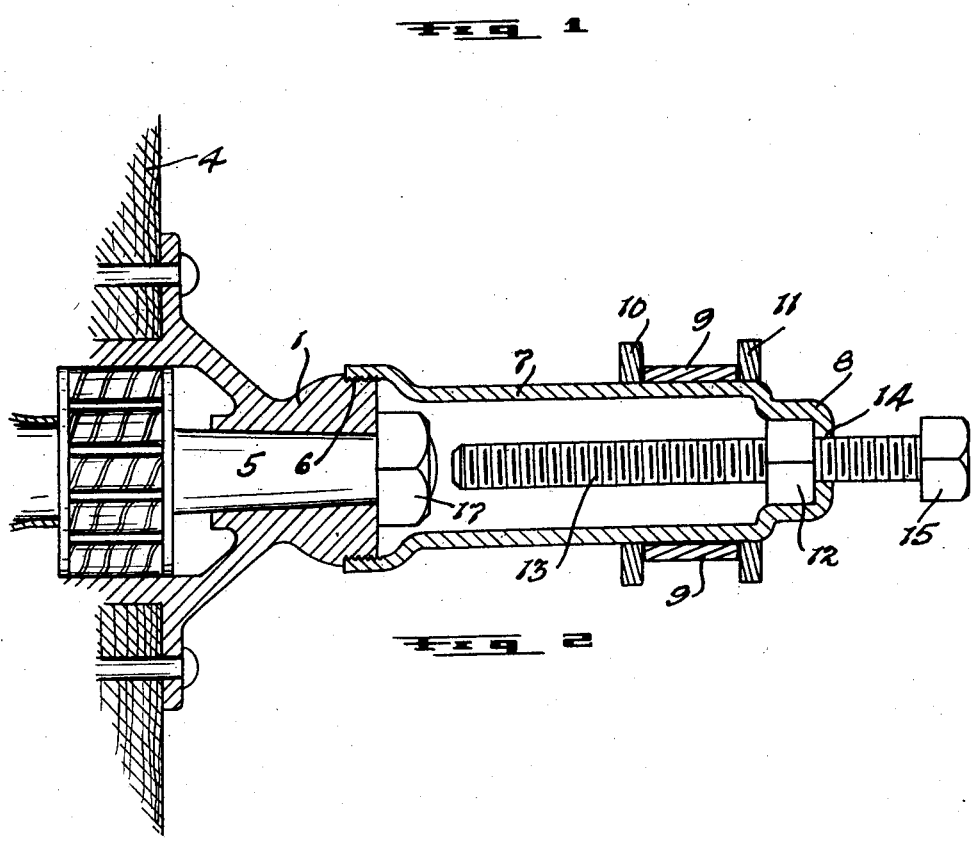
Fig. 2 is an enlarged detailed vertical sectional view longitudinally through the device and through the automobile hub, certain parts being shown in side elevation.

The device can also be used as a wheel puller. When so used, it will be attached to the hub in the manner shown in Figure 2 and the nut 17 of the axle will be removed. The screw 13 will then be tightened up by applying a wrench on the head 15 and as the said screw moves in, it will initially contact with the outer end of the axle 5 and subsequently cause the pulling of the hub and consequently the wheel in an outward direction in respect to the axle.

Whilst the device can be used for readily lifting a wheel and easily permitting of the putting of the chains thereon, it can be also used in the same manner for lifting a wheel out of a rut provided, of course, there is sufficient room between the band and the ground surface to permit of the insertion of a jack. As the outer end of the sleeve is a considerable distance from the wheel, the jack is clear of obstructions and can accordingly be readily operated and there is every opportunity given for obtaining a firm base for the jack.

The device also permits of the convenient and ready removal of the wheel tire avoiding as it does the undesirable trouble as at present experienced in getting a jack underneath say the rear axle where there are obstructions such as trunks, tire carriers and so forth. To remove a tire, one will simply attach the sleeve and jack it up and when the wheel is clear of the ground, will undo the tire clamps and withdraw the same from the wheel rim. The released tire will then be shifted outwardly and dropped on the ground in a location surrounding the jack. One will then place a block, board or the like under the rim and then manipulate the jack to let the rim down to rest on the block. The jack is then removed and the tire is repaired. The tire is replaced by reversing the above operation as will be readily understood.

What I claim as my invention is:—

1. An attachment for hubs including an extended body portion having a threaded opening to be positioned over the threaded end of the hub and a band rotatably mounted on the body portion.

2. An attachment for hubs including an extending body portion having a threaded opening to be positioned over the threaded end of the hub and a band rotatably mounted on the body portion and prevented from end movement thereon.

3. The combination with the screw threaded end of the hub of a motor vehicle, of an extending sleeve having one end interiorly screw threaded to receive the threads of the hub and a band rotatably mounted on the sleeve and prevented from end displacement thereon.

Signed at Winnipeg, this 18th day of August, 1927.

WILLIAM O. B. MOORE.